3,296,157
METHOD OF MANUFACTURING AND SEPARATING EPOXIDE RESINS

Zbigniew Brojer, 15 Ordynacka St.; Piotr Andrzej Penczek, 4 Corazziego St.; and Jerzy Henryk Sas, 24 Nowolipki St., all of Warsaw, Poland
No Drawing. Filed Apr. 5, 1962, Ser. No. 185,241
Claims priority, application Poland, Apr. 13, 1961, 96,243
14 Claims. (Cl. 260—13)

This invention pertains to the method of manufacturing and separating "hard" epoxide resins, which at room temperature are brittle, solid substances, softening above 50° C., obtained from a dihydric phenol, e.g., 2,2-dihydroxydiphenylpropane (bisphenol-A) and glycerol dichlorohydrin, epichlorohydrin, or their homologs.

The known methods of manufacturing hard epoxide resins of a high softening point comprise melting low or medium molecular weight epoxide resins with a diphenol, e.g., with bisphenol-A at high temperatures, at least 140° C. with or without basic catalysts, or directly condensing a diphenol, e.g., bisphenol-A, with glycerol dichlorohydrin, epichlorohydrin, or their homologs in the presence of aqueous solutions of alkalies, e.g., sodium hydroxide; the thus-obtained resin is washed with water in order to remove NaCl and NaOH.

The first of these processes requires the reaction to be carried out in severe conditions, which leads to a deterioration of the properties of the resins, due to the polymerization of epoxide groups taking place at the same time as the polyaddition of epoxide and phenolic hydroxyl groups. As a result, instead of desired resins with linear molecules, resins with branched molecules with a tendency to gell on heating, reduced flexibility, reduced resistance to aging at elevated temperature and poor color are obtained.

In the process of direct polycondensation the synthesis takes place in a thick slurry, where the reaction velocity is restricted on account of the reduced diffusion velocity of the reagents. Considerable thickening of the slurry towards the end of the condensation makes stirring very difficult, particularly in the case of the synthesis of resins with high softening points of 100–155° C.

The washing of the thick resinous slurry with water in order to remove sodium hydroxide and sodium chloride is troublesome and lengthy and has to be repeated several times. This operation requires the use of an apparatus with a very strong, massive stirrer, or an arrangement for washing with water heated above 100° C., at which temperatures the resinous slurry has a lower viscosity; the latter, however, requires a pressure apparatus.

Nor does washing of a solution of the resin in organic solvents with water bring about the desired result, due to an emulsification of the water phase and the organic phase which takes place upon stirring.

According to the present invention, it has been found that in the process of manufacturing the resin by the direct method, by reacting a diphenol, e.g., bisphenol-A and dichlorohydrin, epichlorohydrin or their homologs in a medium constituting an aqueous solution of alkali, such as sodium hydroxide, the above mentioned difficulties, resulting from the very high viscosity of the reaction medium, can be avoided by forming a dispersion of the resin in the water phase in form of beads. The suspension of beads is obtained by introducing into the reaction medium a protective colloid in the form of polyvinyl alcohol, sodium salt of carboxymethylcellulose or another water soluble polymer. To the solution of the dihydric phenol, e.g., bisphenol-A, in glycerol dichlorohydrin, epichlorohydrin or their homologs, a dilute aqueous solution of the protective colloid is added, in an amount not less than 0.02% of the active substance of the colloid in proportion to the diphenol; thereafter a dilute aqueous alkali (e.g., sodium hydroxide) solution is dropped in, while a vigorous stirring is continued and the reaction temperature maintained between 40 and 70° C., depending on the reactants used. After introducing the total amount of alkali, the condensation is completed by further stirring at a higher temperature but not exceeding 100° C. temperature. The suspension of the beads offers little resistance to the stirrer; consequently the condensation can be carried out in ordinary atmospheric pressure mixers fitted with a turbine or a propeller stirrer, at the speed of stirring typical for such mixers.

By the above described process good quality resins of a softening point up to approximately 100° C. can be obtained.

Though it is also possible to obtain in such manner linear epoxide resins of a softening point above 100° C., as a result, however, of the high softening temperatures of these resins, which is higher than the temperature of the reaction medium the diffusion of the reagents into the beads is weak, and the quality of such resins is lower than the quality of the resins manufactured by the known processes. According to the present invention, it has been found that good quality epoxide resins of a high softening point can be obtained by the process of the invention, if an organic, water immiscible solvent is introduced into the reaction mixture in an amount which lowers the softening point of the beads and facilitates the diffusion of the reagents into the beads, but which does not destroy the suspension structure of the resin and does not cause the adhering together of the beads after the mechanical stirring ceases.

Good results were obtained by using xylene as the organic solvent in an amount of 5–30 parts by weight of xylene to 100 parts by weight of diphenol. The higher the softening point of the resin, as determined by the selected ratio of diphenol to epichlorohydrin, dichlorohydrin or their homologs, the greater should be the amount of the added xylene.

Purification of the resin obtained in form of beads by washing with water does not lead to the complete removal of the by-products of the condensation, particularly of NaCl, which is locked inside the beads. In accordance with the invention the resin is cleaned by mechanical grinding of the beads with water, or by filtering off sodium chloride and other impurities from a solution of the resin in a mixture of polar and non-polar solvents, from which the water has been previously removed.

After the condensation is brought to an end the excess alkali is neutralised with diluted acid, e.g. acetic acid. The beads are filtered off from the mother liquor on a filter or a centrifuge and washed a few times with warm water. The thusly externally washed beads are either ground with water or are dissolved in a slightly polar, water immiscible, organic solvent of a boiling point not higher than 160° C.; the solvent dissolves the resin at a temperature lower than the boiling temperature and forms with water a heteroazeotrope. Aromatic hydrocarbons may be used as solvents of this type. When resins of a softening point above 100° C. are synthesized, a small amount of a polar solvent, e.g. methylethylketone is additionally introduced in order to dissolve the resin completely. From the solution or suspension of the resin the water is removed by distilling it off as a heteroazeotrope with part of the introduced solvent.

To the water free resin solution a larger amount of a polar solvent is added to prevent the precipitation of the resin on cooling. The precipitate of sodium chloride with other impurities is separated from the resin solution by filtering it off or centrifuging. The solvents are driven from the clear resin solution by distillation. Towards the end of the distillation the pressure is reduced, in order to remove the rest of the solvents. The process of separating the resin in a pure state from the condensation products allows a practically complete removal of sodium chloride and other salts. At the same time other, water insoluble impurities are removed; these cannot be removed by the classical method of washing with water. These impurities may derive from the apparatus, from raw materials of technical quality, and they may be products of side reactions, undergone by the protective colloid.

For many varnish applications there is no need to drive away the solvents and to separate the resin as a solid; the resin solution purified by the process of the invention can be used directly.

EXAMPLE 1

Into a 1.5 l. capacity flask fitted with a thermometer, a dropping funnel, a reflux condenser and a mechanical propeller stirrer, 114 g. (0.5 mole) of dihydroxydiphenylpropane and 57.8 g. (0.625 mole) of epichlorohydrin are introduced. This reaction mixture is stirred at 45–50° C. for 15–30 minutes in order to obtain a uniform lump free suspension; thereafter a solution of 0.115 g. of the sodium salt of carboxymethylcellulose in 2 g. of water is introduced, stirred at 50° C. for 10–15 minutes and 80 g. of water added.

After an additional 15 minutes of stirring at 45–50° C. the introduction of a 10% aqueous solution of NaOH is begun. 250 g. of the 10% NaOH solution are uniformly introduced through the dropping funnel in one hour's time, with constant stirring of the reagents at 45–50° C. After the introduction of the sodium hydroxide, the reaction mixture is heated up to 95° C. and held at this temperature for 2 hours, without interrupting vigourous stirring. The suspension of the beads is neutralized with 20% acetic acid to pH 6–7 and cooled down to 40° C. The beads are filtered off from the mother liquor and washed a few times with water at 20–40° C. The moist beads are dissolved in approximately 300 g. toluene at approximately 100° C. and thereafter the water is completely driven from the resin by distilling it off, as a heteroazeotrope with toluene. To the suspension, remaining in the flask, 90 g. of toluene and 50 g. of methylethylketone are added and stirred under a reflux condenser at boiling point for 20–30 minutes. The contents of the flask are cooled down to room temperature, the precipitate of NaCl and other impurities is filtered off; a clear solution of the resin is obtained.

A water extract of the resin solution obtained by shaking a sample of the solution with the same volume of distilled water at 60–70° C. should have a neutral reaction and should not give any turbidity after the addition of a 2% aqueous solution of AgNO$_3$.

The solvents are driven from the resin solution under atmospheric pressure and towards the end, under reduced pressure. The rest of the solvents are distilled from the flask at 135–140° C. and 50–60 mm. Hg. pressure.

130 g. of a clear yellowish-brown colored resin are obtained.

*Properties of the resin*

Epoxide groups content: g. eq./100 g. _____ 0.125
Softening point (ball and ring method): ° C. ____ 92.5

EXAMPLE 2

Into a 100 l. capacity reactor, fitted with a thermometer, a propeller stirrer, feed hoppers and a reflux condenser 15.96 kg. (70 moles) of 2,2-dihydroxydiphenylpropane are weighed and, 6.93 kg. (74.9 moles) of epichlorohydrin and 3.7 kg. of xylene are introduced from the feed hoppers. The reaction mixture is stirred for 30 minutes at 45–50° C. in order to obtain a uniform, lump free dispersion; thereafter a solution of 25 g. of the sodium salt of carboxymethylcellulose in 4.5 kg. of water is added; after stirring for 20 minutes at 50° C., 11.2 kg. of water are added and the stirring continued for an additional 20 minutes. Thereafter from the feed hopper 39.2 kg. of a 10% solution of NaOH (98 moles) are introduced uniformly in one hour's time, at 50–60 C., while stirring is continued. After the introduction of the sodium hydroxide the reaction mixture is heated up to 100° C. and the stirring continued at this temperature for 2 hours. The resulting suspension of beads is cooled down to approximately 40° C. and neutralized with 5% hydrochloric acid to pH 6–7. The beads are filtered off from the mother liquor by means of a centrifuge and washed a few times with water.

The centrifuged and washed beads are dissolved in a mixture of 40 kg. of toluene and 4 kg. of methylethylketone at approximately 100° C. and the trace of NaOH, which remained locked inside the beads and was not neutralized after the condensation, is accurately neutralized with 5% hydrochloric acid. The amount of acid is based on the amount used to neutralize a laboratory sample of the beads dissolved in acetone.

Thereafter the water is driven off by distillation, as a heteroazeotrope with toluene. To the suspension remaining in the reactor 10 kg. of toluene and 7 kg. of acetone are added and stirred for 30 minutes under a reflux condenser at boiling point; thereafter the reactor's contents are cooled down to 20–25° C. and the precipitate of sodium chloride and other impurities is separated by filtering it off on a pressure filter; a clear solution of the resin is obtained. The accuracy of the separation of NaCl and of the neutralization of NaOH is controlled by checking the water extract. An extract obtained by shaking a sample of the solution with the same volume of water at 40–50° C. should have a neutral reaction and should not give any turbidity after addition of a 25% aqueous solution of AgNO$_3$. The solvents are driven away from the resin solution under atmospheric pressure and towards the end under reduced pressure. The rest of the solvents are distilled from the reactor at 150–160° C. and at 50–60 mm. Hg pressure.

18 kg. of a yellowish-brown colored resin are obtained.

*Properties of the resin*

Epoxide groups contents, g. eq./100 g. _____ 0.04
Softening point (ball and ring method) _____ 132° C.

What is claimed is:

1. A method of manufacturing epoxide resins having a softening point of 50° C.–160° C. which comprises heating and mixing a dihydric phenol with a chlorohydrin selected from the group which consists of glycerol dichlorohydrin and epichlorohydrin in the presence of aqueous caustic alkali and in the presence of a water-soluble, organic polymer in a minute amount effective to form a protective colloid, whereby the thus-formed epoxide resin is obtained as a suspension of easily stirrable beads in the aqueous mixture.

2. A method of manufacturing epoxide resins having a softening point of 50°–160° C. which comprises mixing at a temperature of about 40° C. to 100° C. a dihydric phenol with a chlorohydrin selected from the group which consists of glycerol dichlorohydrin and epichlorohydrin in the presence of aqueous caustic alkali and in the presence of a water-soluble, organic polymer in a minute amount effective to form a protective colloid, whereby the thus-formed epoxide resin is obtained as a suspension of easily stirrable beads in the aqueous mixture.

3. A method as defined in claim 2 and the further step of separating impurities from said thus-formed epoxide resin by mechanical grinding of said beads of epoxide resin with water.

4. A method as defined in claim 2 wherein said thus-formed epoxide resin is separated from impurities by dissolving said beads of epoxide resin in a mixture of polar and non-polar solvents, removing water by heteroazeotropic distillation, filtering off the precipitated impurities.

and removing said polar and non-polar solvents by distillation.

5. The method of claim 2 in which said organic polymeric is the sodium salt of carboxymethylcellulose in an amount not less than 0.02 part by weight per 100 parts by weight of the dihydric phenol used for the reaction.

6. The method of claim 2 in which said organic polymer is polyvinyl alcohol, in an amount not less than 0.05 part by weight per 100 parts by weight of the diphenol used for the reaction.

7. The method of claim 2 which comprises the introduction into the reaction mixture of an organic, water-immiscible, solvent in an amount of 5–30 parts by weight per 100 parts by weight of diphenol.

8. The method of claim 7 in which the organic solvent is xylene.

9. A method of manufacturing epoxide resins having a softening point of 50°–160° C. which comprises mixing and heating a dihydric phenol with a chlorohydrin selected from the group which consists of glycerol dichlorohydrin and epichlorohydrin, in the presence of aqueous caustic alkali, and in the presence of an organic polymer selected from the group which consists of polyvinyl alcohol and the sodium salt of carboxymethylcellulose, in a minute amount effective to form a protective colloid but not less than 0.02% by weight based on said dihydric phenol, whereby the thus-formed epoxide resin is obtained as a suspension of easily stirrable beads.

10. A method of manufacturing epoxide resins having a softening point of 50° C.–160° C. which comprises heating and mixing biphenol-A with a chlorohydrin selected from the group which consists of glycerol dichlorohydrin and epichlorohydrin in the presence of aqueous caustic alkali and in the presence of a water-soluble, organic polymer in a minute amount effective to form a protective colloid, whereby the thus-formed epoxide resin is obtained as a suspension of easily stirrable beads in the aqueous mixture.

11. A method of manufacturing epoxide resins having a softening point of 50° C.–160° C. which comprises mixing and heating at a temperature of about 40° C.–100° C. bisphenol-A with a chlorohydrin selected from the group which consists of glycerol dichlorohydrin and epichlorohydrin, in the presence of aqueous caustic alkali, and in the presence of an organic polymer selected from the group which consists of polyvinyl alcohol and the sodium salt of carboxymethylcellulose, in a minute amount effective to form a protective colloid but not less than 0.02% by weight based on said bisphenol-A, whereby the thus-formed epoxide resin is obtained as a suspension of easily stirrable beads.

12. In a method of manufacturing and separating epoxide resins of a softening point of 50° C.– 160° C. by condensation of dihydric phenol with a chlorohydrin selected from the group which consists of glycerol dichlorohydrin and epichlorohydrin, carried out in a medium of aqueous caustic alkali, the improvement which comprises carrying out said condensation by heating and mixing said dihydric phenol with said chlorohydrin in the presense of a minute amount of a water-soluble, organic polymer effective as a protective colloid for said epoxide resin whereby said epoxide resin is obtained as a water suspension of beads.

13. In a method of manufacturing and separating epoxide resins of a softening point of 50° C.–160° C. by condensation of bisphenol-A with a chlorohydrin selected from the group which consists of glycerol dichlorohydrin and epichlorohydrin, carried out in a medium of aqueous caustic alkali, the improvement which comprises carrying out said condensation by heating and mixing said bisphenol with said chlorohydrin in the presence of a minute amount of a water-soluble, organic polymer effective as a protective colloid for said epoxide resin, whereby said epoxide resin is obtained as a water suspension of beads.

14. In a method of manufacturing and separating epoxide resins of a softening point of 50° C.–160° C. by condensation of bisphenol-A with a chlorohydrin selected from the group which consists of glycerol dichlorohydrin and epichlorohydrin, carried out in a medium of aqueous caustic alkali, the improvement which comprises carrying out said condensation by mixing and heating to a temperature of about 40° C. to 100° C. said bisphenol-A with said chlorohydrin in the presence of a water-soluble organic polymer selected from the group which consists of polyvinyl alcohol and the sodium salt of carboxymethylcellulose, in a minute amount effective to form a protective colloid for said epoxide resin but not less than 0.02% by weight based on said bisphenol-A, whereby said epoxide resin is obtained as a suspension of easily stirrable beads.

References Cited by the Examiner

UNITED STATES PATENTS

| | | | |
|---|---|---|---|
| 2,686,771 | 8/1954 | Whitehill et al. | 260—47 |
| 2,694,694 | 11/1954 | Greenlee | 260—47 |
| 2,767,157 | 10/1956 | Masters | 260—47 |
| 2,824,855 | 2/1958 | Freeman et al. | 260—47 |
| 2,886,472 | 5/1959 | Conds et al. | 260—47 |

WILLIAM H. SHORT, Primary Examiner.

LOUISE P. QUAST, L. J. BERCOVITZ, Examiners.

T. D. KERWIN, J. NORRIS, Assistant Examiners.